(12) United States Patent
Nakajima

(10) Patent No.: US 11,536,736 B2
(45) Date of Patent: Dec. 27, 2022

(54) AUTOMATIC ANALYZER

(71) Applicant: JEOL Ltd., Tokyo (JP)

(72) Inventor: Takeichirou Nakajima, Tokyo (JP)

(73) Assignee: JEOL Ltd., Tokyo (JP)

( * ) Notice: Subject to any disclaimer, the term of this patent is extended or adjusted under 35 U.S.C. 154(b) by 403 days.

(21) Appl. No.: 16/827,027

(22) Filed: Mar. 23, 2020

(65) Prior Publication Data
US 2020/0341020 A1 Oct. 29, 2020

(30) Foreign Application Priority Data
Apr. 26, 2019 (JP) .............................. JP2019-084921

(51) Int. Cl.
*G01N 35/00* (2006.01)
*G01N 35/02* (2006.01)

(52) U.S. Cl.
CPC ..... *G01N 35/00732* (2013.01); *G01N 35/025* (2013.01); *G01N 2035/00752* (2013.01)

(58) Field of Classification Search
CPC ........... G01N 35/00732; G01N 35/025; G01N 2035/00752
USPC ......................................................... 422/64
See application file for complete search history.

(56) References Cited

U.S. PATENT DOCUMENTS

| | | |
|---|---|---|
| 2008/0071503 A1 | 3/2008 | Fujita et al. |
| 2009/0081794 A1 | 3/2009 | Wakamiya et al. |
| 2009/0263281 A1 | 10/2009 | Ushiku et al. |
| 2010/0101339 A1 | 4/2010 | Tatsutani et al. |
| 2012/0239676 A1* | 9/2012 | Kaneko ............ G01N 35/00732 707/E17.014 |
| 2013/0103322 A1* | 4/2013 | Morimoto ........... H01J 49/0036 702/20 |
| 2015/0192598 A1* | 7/2015 | Yasuzawa .......... G01N 35/1081 422/67 |

(Continued)

FOREIGN PATENT DOCUMENTS

| | | |
|---|---|---|
| JP | 200851723 A | 3/2008 |
| JP | 200974885 A | 4/2009 |

(Continued)

OTHER PUBLICATIONS ip.com*

(Continued)

*Primary Examiner* — Allyson N Trail
(74) *Attorney, Agent, or Firm* — The Webb Law Firm

(57) ABSTRACT

An automatic analyzer includes an input reception unit that receives an operation to specify a search condition for sample information, an operation to execute search of the sample information, and an operation to specify whether only pieces of the sample information of samples under measurement among all samples are set as search targets; and a display control unit that, when the operation to execute search of the sample information is performed in a state in which only pieces of the sample information of samples under measurement are specified to be search targets, sets only pieces of the sample information of samples under measurement among the sample information of all samples as search targets based on the progress information, extracts pieces of the sample information of samples matching with a specified search condition, and causes the extracted pieces of the sample information to be displayed in a list form.

6 Claims, 14 Drawing Sheets

(56) References Cited

U.S. PATENT DOCUMENTS

2019/0187164 A1*  6/2019  Fukaya ............ G01N 35/00722
2020/0149394 A1*  5/2020  Hao .................... G01N 33/241
2020/0341020 A1* 10/2020  Nakajima ........ G01N 35/00722
2021/0063410 A1*  3/2021  Wilcox ............. G01N 33/6848

FOREIGN PATENT DOCUMENTS

JP    2001124782 A    5/2011
JP    2017129393 A    7/2017

OTHER PUBLICATIONS

Office Action issued in JP2019084921 dated Jan. 26, 2021.
Extended European Search Report issued in EP20163989.5 dated Sep. 23, 2020.
Office Action issued in JP2019-084921 dated Jun. 22, 2021.

* cited by examiner

| No. | SAMPLE INFORMATION | END TIME |
|---|---|---|
| 1 | 0601000101 | 17:04 |
| 2 | 0601000105 | 17:05 |
| 3 | 0601000123 | 17:06 |
| 4 | 0601000128 | 17:07 |
| 5 | 0601000126 | 17:08 |
| 6 | 0601000133 | 17:11 |
| 7 | 0601000140 | 17:12 |
| 8 | 0601000143 | 17:13 |
| 9 | 0601000174 | 17:15 |
| 10 | 0601000204 | 17:16 |
| 11 | 0601000211 | 17:18 |
| 12 | 0601000220 | 17:20 |

SAMPLE SEARCH

NUMBER OF HITS: 75 HITS

☑ ONLY PATIENT SAMPLES UNDER MEASUREMENT

SEARCH KEYWORD

DETAILED INFORMATION:

| MEASUREMENT SITUATION | UNDER MEASUREMENT 2019/03/20 17:05:50 |
|---|---|
| ATTRIBUTE INFORMATION | SERUM PATIENT SAMPLE (GENERAL) |
| COMMENTS | |
| PATIENT COMMENTS | |
| SAMPLE POSITION | RACK 00046-1 |

RESULT REVIEW

CLOSE

FIG. 13

| No. | SAMPLE INFORMATION | STATUS |
|---|---|---|
| 1 | 0103100016901 | ⊗ |
| 2 | 0103100017001 | ⊗ |
| 3 | 0103100017004 | ◐ |
| 4 | 0103100016401 | ◐ |
| 5 | 0103100013801 | ⊗ |
| 6 | 0103100015901 | ◐ |
| 7 | 0103100016801 | ⊗ |
| 8 | 0103100013901 | ◐ |
| 9 | 0103100900501 | ◐ |
| 10 | 0103100015001 | ◐ |
| 11 | 0103100014001 | ⊗ |
| 12 | 0103100016701 | ⊗ |

SAMPLE SEARCH

NUMBER OF HITS: 75 HITS

☑ ONLY SAMPLES THAT HAVE NOT NORMALLY COMPLETED MEASUREMENT / SEARCH KEYWORD

DETAILED INFORMATION:

| MEASUREMENT SITUATION | MEASUREMENT COMPLETED 2016/10/30 15:57:50 |
|---|---|
| ATTRIBUTE INFORMATION | SERUM PATIENT SAMPLE (GENERAL) |
| COMMENTS | |
| PATIENT COMMENTS | |
| SAMPLE POSITION | BIOCHEMICAL ANALYZER ST-01 |

- RESULT REVIEW
- TRANSMISSION TO LIS
- REPORT PRINT
- REAL-TIME MONITOR
- CLOSE

FIG. 15

PRIOR ART

AUTOMATIC ANALYZER

CROSS-REFERENCE TO RELATED APPLICATION

This application claims priority to Japanese Patent Application No. 2019-084921 filed Apr. 26, 2019, the disclosure of which is hereby incorporated by reference in its entirety.

BACKGROUND OF THE INVENTION

Field of the Invention

The present invention relates to an automatic analyzer.

Description of Related Art

Automatic analyzers are devices that make samples react with reagents to analyze the components of the samples. As such, biochemical analyzers that analyze various components contained in samples such as blood and urine have been known. In a biochemical analyzer, a sample is diluted under a certain condition and then dispensed into a reaction container, and the sample and a reagent related to an analysis item are mixed together inside the reaction container for reaction. After that, the absorbance of the diluted sample dispensed into the reaction container is measured and converted into concentration to analyze a measurement target substance contained in the sample (see, for example, JP-A-2017-129393).

Figure 15:
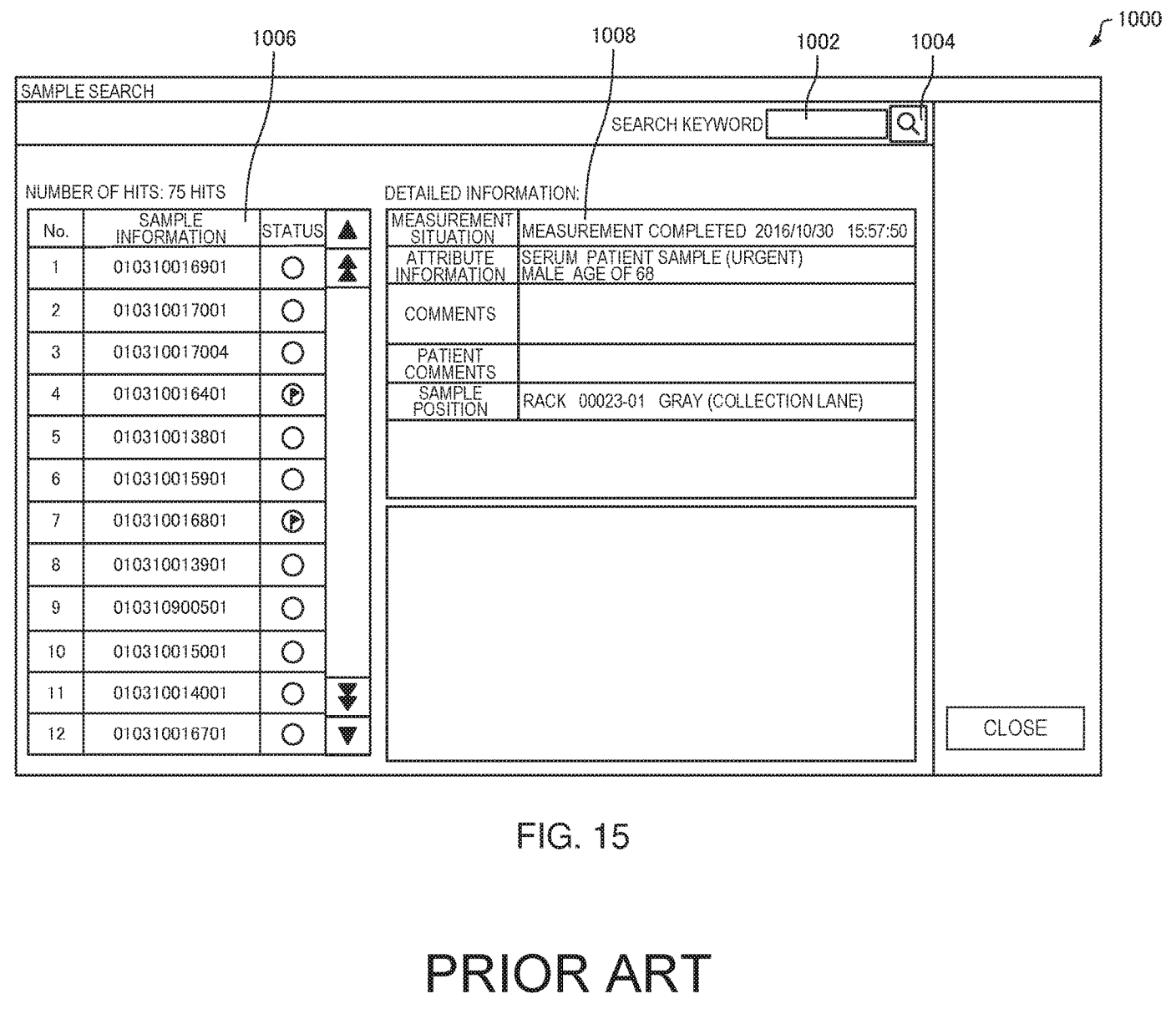

FIG. 15 is a diagram illustrating an example of a sample search screen 1000 of a conventional automatic analyzer. The sample search screen 1000 is used to, for example, confirm the progress of the measurement of samples. As illustrated in FIG. 15, an input field 1002 to which a search keyword is input, a search execution button 1004, a display region 1006 in which the sample information of samples matching with a sample keyword is displayed, and a detailed information display region 1008 are displayed on the sample search screen 1000.

For example, when a keyword is input to the input field 1002 and the search execution button 1004 is pressed, a list of samples matching with the keyword is displayed in the display region 1006. When one sample ID is selected from a list of sample IDs displayed in the display region 1006, the detailed sample information of a sample corresponding to the selected sample ID is displayed in the detailed information display region 1008.

The automatic analyzer is mainly used to perform clinical examination. If an examination result of the examination of a patient's sample is available at the time of receiving an inquiry about the progress of the examination from a doctor, the examination result is displayed on a result review screen (not shown).

In contrast, if the examination result is not available, there is a need to give a reply as to when the examination result will be available. In this case, an operator first inputs a keyword such as a sample ID to the input field 1002 and presses the search execution button 1004. Next, the operator selects the sample ID corresponding to the inquired sample out of sample IDs displayed in the display region 1006. Then, the operator confirms a measurement situation displayed in the detailed information display region 1008 to confirm a measurement end time.

Here, for example, when receiving an inquiry about a sample under measurement, the operator is required to input a keyword and select a sample ID to confirm progress information on the sample search screen 1000 as described above. As a result, since the operator is not allowed to search for samples under measurement in a lump, the usability of the automatic analyzer is poor. Further, for example, when receiving an inquiry about a sample that has not normally completed measurement, the operator is not also allowed to search for samples that have not normally completed the measurement in a lump. Therefore, the usability of the automatic analyzer is also poor.

SUMMARY OF THE INVENTION

According to a first aspect of the invention, there is provided an automatic analyzer including:

a reading unit that reads identification information for identifying samples;

an analysis unit that measures samples;

an analysis control unit that performs processing to acquire measurement item information of samples identified by the identification information read by the reading unit and control the analysis unit based on the acquired measurement item information and processing to update progress information of measurement of samples;

an input reception unit that receives an operation to specify a search condition for sample information of samples, an operation to specify whether pieces of only the sample information of samples under measurement among all samples are set as search targets or not, and an operation to execute search of the sample information; and a display control unit that, when the operation to execute search of the sample information is performed in a state in which only pieces of the sample information of samples under measurement are specified to be search targets, sets only pieces of the sample information of samples under measurement among all samples as search targets based on the progress information, extracts pieces of the sample information of samples matching with a specified search condition from the set search targets, and causes the extracted pieces of the sample information to be displayed on a display unit in a list form.

According to a second aspect of the invention, there is provided an automatic analyzer including:

a reading unit that reads identification information for identifying samples;

an analysis unit that measures samples;

an analysis control unit that performs processing to acquire measurement item information of samples identified by the identification information read by the reading unit and control the analysis unit based on the acquired measurement item information and processing to update progress information of measurement of samples;

an input reception unit that receives an operation to specify a search condition for sample information of samples, an operation to specify whether only pieces of the sample information of samples that have not normally completed measurement among all samples are set as search targets or not, and an operation to execute search of the sample information; and a display control unit that, when the operation to execute search of the sample information is performed in a state in which only pieces of the sample information of samples that have not normally completed measurement are specified to be search targets, sets only pieces of the sample information of samples that have not normally completed measurement among all samples as search targets based on the progress information and a measurement result of the analysis unit, extracts pieces of the sample information of samples matching with a specified search condition from the set search targets, and causes the extracted pieces of the sample information to be displayed on a display unit in a list form.

BRIEF DESCRIPTION OF THE DRAWINGS

FIG. 4 is a diagram illustrating an example of a sample search screen of the automatic analyzer according to the first embodiment.

FIG. 5 is a diagram illustrating an example of a sample search screen of the automatic analyzer according to the first embodiment.

FIG. 13 is a diagram illustrating an example of a sample search screen of an automatic analyzer according to a fourth embodiment.

FIG. 15 is a diagram illustrating an example of a sample search screen of a conventional automatic analyzer.

Figure 1:
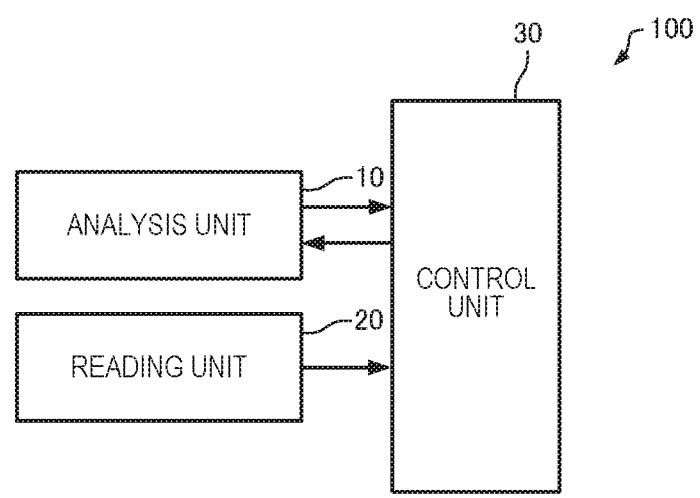
FIG. 1 is a diagram illustrating a configuration of an automatic analyzer according to the first embodiment.

DESCRIPTION OF THE INVENTION (1) According to an embodiment of the invention, there is provided an automatic analyzer including:

a reading unit that reads identification information for identifying samples;

an analysis unit that measures samples;

an analysis control unit that performs processing to acquire measurement item information of samples identified by the identification information read by the reading unit and control the analysis unit based on the acquired measurement item information and processing to update progress information of measurement of samples;

an input reception unit that receives an operation to specify a search condition for sample information of samples, an operation to specify whether only pieces of the sample information of samples under measurement among all samples are set as search targets or not, and an operation to execute search of the sample information; and a display control unit that, when the operation to execute search of the sample information is performed in a state in which only pieces of the sample information of samples under measurement are specified to be search targets, sets only pieces of the sample information of samples under measurement among all samples as search targets based on the progress information, extracts pieces of the sample information of samples matching with a specified search condition from the set search targets, and causes the extracted pieces of the sample information to be displayed on a display unit in a list form.

Since the above automatic analyzer can set only pieces of the sample information of samples under measurement as search targets and extract pieces of the sample information matching with a search condition, the sample information of samples under measurement can be easily confirmed with excellent usability.

(2) According to an embodiment of the invention, there is provided an automatic analyzer including:

a reading unit that reads identification information for identifying samples;

an analysis unit that measures samples;

an analysis control unit that performs processing to acquire measurement item information of samples identified by the identification information read by the reading unit and control the analysis unit based on the acquired measurement item information and processing to update progress information of measurement of samples;

an input reception unit that receives an operation to specify a search condition for sample information of samples, an operation to specify whether only pieces of the sample information of samples that have not normally completed measurement among all samples are set as search targets or not, and an operation to execute search of the sample information; and a display control unit that, when the operation to execute search of the sample information is performed in a state in which only pieces of the sample information of samples that have not normally completed measurement are specified to be search targets, sets only pieces of the sample information of samples that have not normally completed measurement among all samples as search targets based on the progress information and a measurement result of the analysis unit, extracts pieces of the sample information of samples matching with a specified search condition from the set search targets, and causes the extracted pieces of the sample information to be displayed on a display unit in a list form.

Since the above automatic analyzer can set only pieces of the sample information of samples that have not normally completed measurement as search targets and extract pieces of the sample information matching with a search condition, the sample information of samples that have not normally completed measurement can be easily confirmed with excellent usability.

Preferred embodiments of the invention are described in detail below with reference to the drawings. Note that the following embodiments do not unduly limit the scope of the invention as stated in the claims. In addition, all of the elements described below are not necessarily essential requirements of the invention.

1. First Embodiment 1.1. Configuration of Automatic Analyzer

First, an automatic analyzer according to a first embodiment will be described with reference to the drawings. FIG. 1 is a diagram illustrating a configuration of an automatic analyzer 100 according to the first embodiment.

The automatic analyzer 100 is, for example, a biochemical analyzer that automatically measures the amount of a specific component contained in a sample such as blood and urine taken from a living body. Note that the automatic analyzer 100 may be configured to be capable of performing not only the measurement of biochemical items but also measurement in a wide range of fields such as immune serums and tumor markers.

As illustrated in FIG. 1, the automatic analyzer 100 includes an analysis unit 10 that measures samples, a reading unit 20 that reads identification information for identifying samples, and a control unit 30 that controls the operations of respective units constituting the analysis unit 10.

1.1.1. Configuration of Analysis Unit

Figure 2:
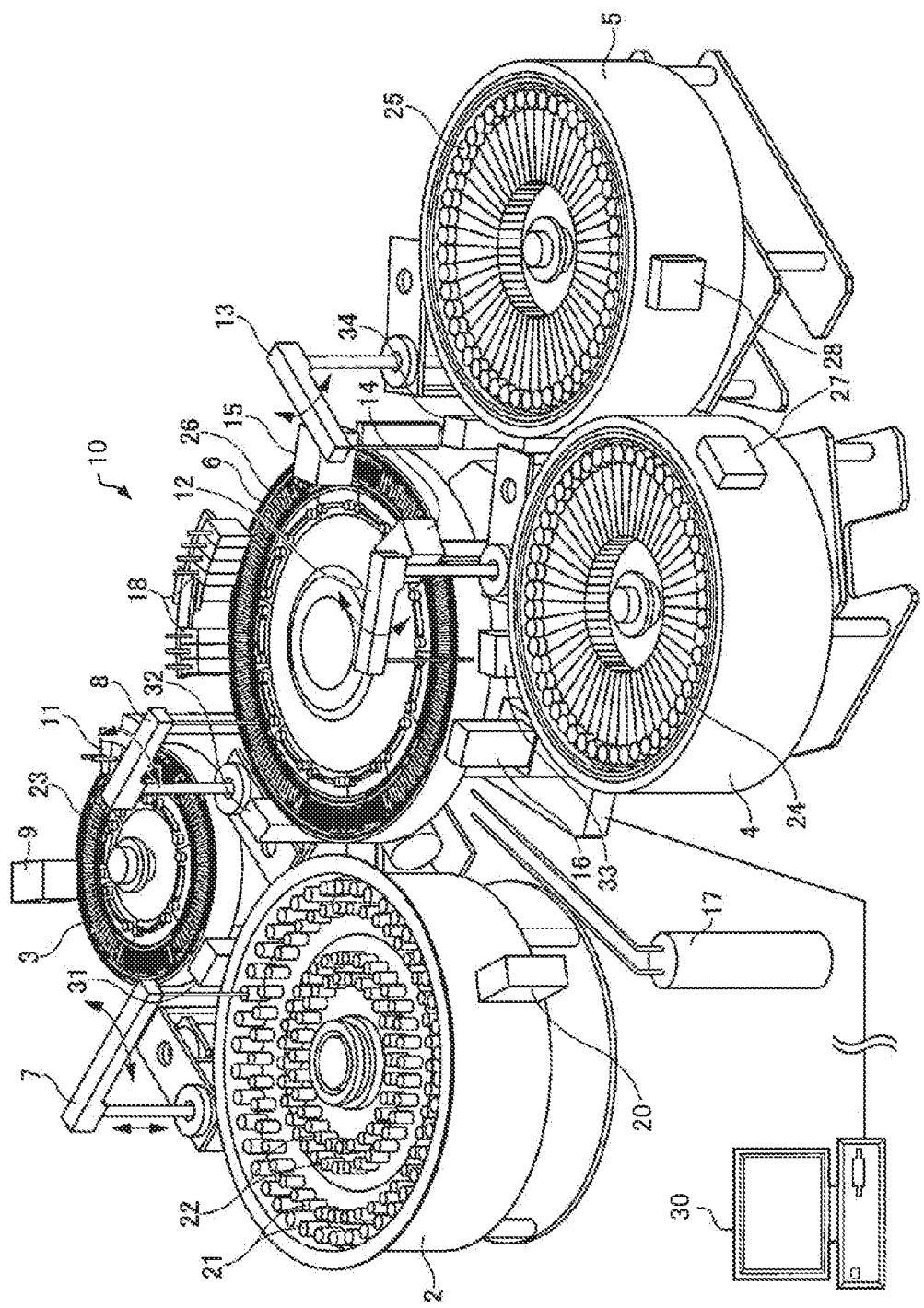
FIG. 2 is a diagram schematically illustrating a configuration of an analysis unit.

FIG. 2 is a diagram schematically illustrating a configuration of the analysis unit 10.

The analysis unit 10 includes a sample turntable 2, a dilution turntable 3, a first turntable 4, a second turntable 5, and a reaction turntable 6. Further, the automatic analyzer 100 includes an original sample sampling probe 7, a diluted sample sampling probe 8, a dilution stirring mechanism 9, a dilution container cleaning mechanism 11, a first reagent dispensing probe 12, a second reagent dispensing probe 13, a first reaction solution stirring mechanism 14, a second reaction solution stirring mechanism 15, a multiwavelength photometer 16, a thermostat bath 17, and a reaction container cleaning mechanism 18.

In the analysis unit 10, one unit of the repetition of a sample dispensing operation by various probes such as the diluted sample sampling probe 8 or a stirring operation by the first reaction solution stirring mechanism 14 or the second reaction solution stirring mechanism 15 is, for example, performed for a one-cycle time.

The sample turntable 2 holds sample containers 21 in which a sample is accommodated and heat insulation sample containers 22. The sample turntable 2 holds a plurality of the sample containers 21 and a plurality of the heat insulation sample containers 22. In the sample containers 21, a sample and a detergent are accommodated. In the heat insulation sample containers 22, a diluted solution other than a physiological saline solution that is a general diluted solution is accommodated.

The dilution turntable 3 holds a plurality of dilution containers 23. In the dilution containers 23, an original sample sucked in and diluted from the sample containers 21 arranged on the sample turntable 2, that is, a diluted sample is accommodated.

The first turntable 4 holds a plurality of first reagent containers 24. Further, the second turntable 5 holds a plurality of second reagent containers 25.

A first reagent is accommodated in the first reagent containers 24, and a second reagent is accommodated in the second reagent containers 25. Note that the first reagent containers 24 and the second reagent containers 25 will also be simply called "reagent containers" when they are not distinguished from each other.

The first turntable 4 is provided with a first reagent barcode reader 27 that reads barcodes attached to the lateral surfaces of the first reagent containers 24. The second turntable 5 is provided with a second reagent barcode reader 28 that reads barcodes attached to the lateral surfaces of the second reagent containers 25. Since the first reagent barcode reader 27 and the second reagent barcode reader 28 can locate the reagent containers that are used as a measurement item, the reagent containers may be placed at arbitrary positions.

The reaction turntable 6 holds a plurality of reaction containers 26. The reaction turntable 6 intermittently moves the reaction containers 26. In the reaction containers 26, diluted samples sampled from the dilution containers 23 of the dilution turntable 3, a first reagent sampled from the first reagent containers 24 of the first turntable 4, and a second reagent sampled from the second reagent containers 25 of the second turntable 5 are filled. Inside the reaction containers 26, the diluted samples, the first reagent, and the second reagent are stirred to cause a reaction.

The original sample sampling probe 7 sucks a predetermined amount of solutions such as samples and detergents from the sample containers 21 or the heat insulation sample containers 22 conveyed to previously-set sucking positions and ejects the sucked samples and a predetermined amount of a diluted solution (for example, a physiological saline solution) supplied from the original sample sampling probe 7 itself into the dilution containers 23 conveyed to previously-set ejecting positions. As a result, the samples are diluted to a predetermined multiple concentration inside the dilution containers 23. In this manner, the original sample sampling probe 7 dispenses samples into the dilution containers 23. The original sample sampling probe 7 is cleaned by an original sample sampling probe cleaning mechanism 31.

The diluted sample sampling probe 8 sucks a predetermined amount of diluted samples from the dilution containers 23 of the dilution turntable 3 and ejects the sucked diluted samples into the reaction containers 26 of the reaction turntable 6. The diluted sample sampling probe 8 is cleaned by a diluted sample sampling probe cleaning mechanism 32.

The dilution stirring mechanism 9 inserts a stirring rod (not shown) into the dilution containers 23 and stirs samples and a diluted solution. The dilution container cleaning mechanism 11 supplies a detergent from a cleaning pump to a dilution container cleaning nozzle and ejects the detergent into the dilution containers 23 from the dilution container cleaning nozzle.

The first reagent dispensing probe 12 sucks a predetermined amount of a first reagent from the first reagent containers 24 conveyed to previously-set sucking positions and ejects the sucked first reagent into the reaction containers 26 conveyed to previously-set ejecting positions. The first reagent dispensing probe 12 is cleaned by a first reagent probe cleaning mechanism 33.

The second reagent dispensing probe 13 sucks a predetermined amount of a second reagent from the second reagent containers 25 conveyed to previously-set sucking positions and ejects the sucked second reagent into the reaction containers 26 conveyed to the previously-set ejecting positions. The second reagent dispensing probe 13 is cleaned by a second reagent probe cleaning mechanism 34.

The first reaction solution stirring mechanism 14 inserts a stirring rod (not shown) into the reaction containers 26 and stirs diluted samples and a first reagent. The second reaction solution stirring mechanism 15 inserts a stirring rod (not shown) into the reaction containers 26 and stirs a mixture of diluted samples, a first reagent, and a second reagent. The reaction container cleaning mechanism 18 cleans the inside of the reaction containers 26 that have finished an analysis.

The multiwavelength photometer 16 performs optical measurement (colorimetric measurement) on a mixture of diluted samples having reacted with a first reagent and a second reagent using a light source lamp that irradiates the reaction containers 26 with rays. The multiwavelength photometer 16 outputs the amounts of various components in samples in terms of absorbance and detects the reaction states of diluted samples. The measurement data of samples in the multiwavelength photometer 16 is transmitted to the control unit 30.

The thermostat bath 17 keeps the temperature of the reaction containers 26 provided in the reaction turntable 6 constant at all times.

1.1.2. Configuration of Reading Unit

As illustrated in FIG. 2, the reading unit 20 that reads the identification information of samples is arranged in the analysis unit 10. The reading unit 20 reads sample IDs from barcodes attached to the lateral surfaces of the sample containers 21 and the heat insulation sample containers 22 accommodated in the sample turntable 2. The barcodes are those obtained by coding sample IDs indicating the identification information of samples. The reading unit 20 is, for example, a barcode reader. The identification information read by the reading unit 20 is transmitted to the control unit 30. As a result, the control unit 30 is allowed to manage samples and a diluted solution accommodated in the sample containers 21 and the heat insulation sample containers 22.

1.1.3. Configuration of Control Unit

Figure 3:
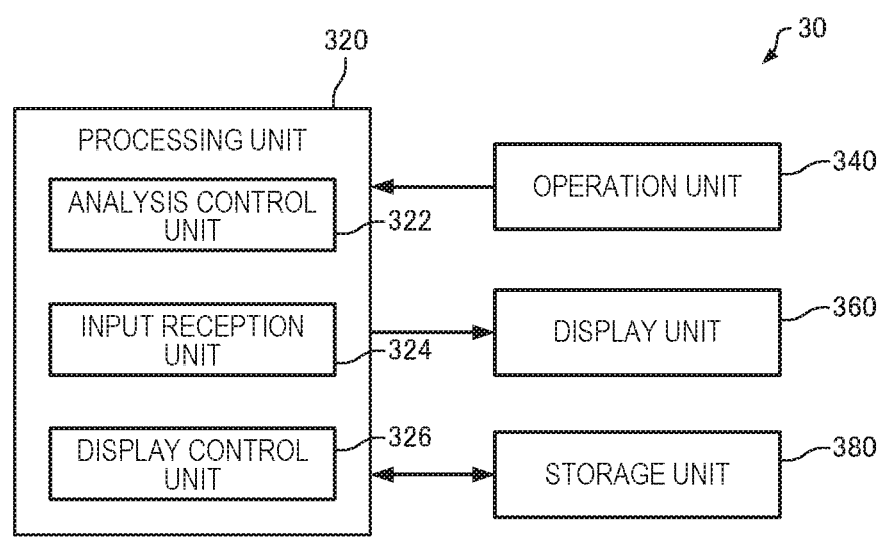
FIG. 3 is a diagram illustrating a configuration of a control unit.

FIG. 3 is a diagram illustrating a configuration of the control unit 30. As illustrated in FIG. 3, the control unit 30 includes a processing unit 320, an operation unit 340, a display unit 360, and a storage unit 380.

The operation unit 340 performs processing to acquire an operation signal related to a user's operation and transmit the acquired operation signal to the processing unit 320. The operation unit 340 may be realized by, for example, an input device such as a button, a key, a touch panel display, and a microphone.

The display unit 360 outputs an image generated by the processing unit 320. The display unit 360 may be realized by, for example, a display such as a liquid crystal display (LCD).

The storage unit 380 stores a program or data used when the processing unit 320 performs various calculation processing or various control processing. Further, the storage unit 380 is also used as the work area of the processing unit 320. The storage unit 380 may be realized by, for example, a random-access memory (RAM), a read-only memory (ROM), and a hard disk drive.

The storage unit 380 stores the measurement items of respective samples. Note that the measurement items of the respective samples may be acquired from a host computer (not shown).

Further, the storage unit 380 stores the sample information of respective samples. The sample information includes information such as the identification information of samples, comments on samples, and the progress information of samples including the statuses of samples.

Sample IDs are information for identifying samples and are an example of the identification information of the samples. The comments are comments input by an operator.

The progress information is, for example, information on the progress of the measurement of samples and includes, for example, information such as the statuses of samples, the positions of samples, the records of measurement, and the end times of the measurement of samples. The statuses of samples are information indicating the current measurement statuses of samples. The statuses of samples include, for example, the status of "measurement completion" indicating that samples have been normally measured, the status of "on standby" indicating that samples are on standby for measurement, the status of "under measurement" indicating that samples are being measured, or the like. Further, the progress information includes information such as the informa-tion of a dispensing error, information indicating that measurement has been stopped due to a device error, and information indicating that re-examination is required to be performed on a measurement item.

Further, the storage unit 380 stores measurement data indicating the measurement results of respective samples. For example, the measurement data of samples in the multiwavelength photometer 16 is transmitted to the control unit 30 and stored in the storage unit 380.

The processing unit 320 performs processing such as processing to control the respective units constituting the automatic analyzer 100, processing to cause a user interface screen or the like to be displayed on the display unit 360, and processing to acquire the measurement data of samples. The functions of the processing unit 320 may be realized when a program is performed by various processors (such as a central processing unit (CPU)). Note that at least a part of the functions of the processing unit 320 may be realized by a dedicated circuit such as an ASIC (such as a gate array). The processing unit 320 includes an analysis control unit 322, an input reception unit 324, and a display control unit 326.

The analysis control unit 322 controls the analysis unit 10. For example, when the reading unit 20 reads sample IDs, the analysis control unit 322 reads the measurement item information of samples corresponding to the sample IDs from the storage unit 380. The analysis control unit 322 controls the analysis unit 10 based on the acquired measurement item information. As a result, measurement (examination) is performed according to the measurement items of samples in the analysis unit 10. The measurement data of samples obtained by the analysis unit 10 is transmitted to the analysis control unit 322. The analysis control unit 322 causes the acquired measurement data to be stored in the storage unit 380.

The analysis control unit 322 updates progress information. For example, when the reading unit 20 reads sample IDs, the analysis control unit 322 generates the progress information of samples corresponding to the sample IDs and causes the generated progress information to be stored in the storage unit 380. The analysis control unit 322 updates the progress information for each cycle, for example. Further, the analysis control unit 322 updates the status information of samples for each cycle.

The analysis control unit 322 calculates, for example, the end times of the measurement of samples. The analysis control unit 322 calculates a measurement time for each of measurement items based on the information of the measurement items of samples. For example, using a time at which the original sample sampling probe 7 had ejected a diluted sample into the dilution containers 23 as a reference time, the analysis control unit 322 determines a measurement end time initially from the measurement time of a measurement item that takes the longest time for measurement. Then, the analysis control unit 322 causes the determined end times of the measurement to be stored in the storage unit 380.

The input reception unit 324 receives an operation input from the operation unit 340. For example, as will be described later, the input reception unit 324 receives an operation to specify whether only pieces of the sample information of samples under measurement are set as search targets or not, an operation to specify the search condition for the sample information, an operation to execute the search of the sample information, or the like. In addition, the input reception unit 324 receives an operation to select sample information displayed in a list form.

Here, the "under measurement" indicates, for example, a period until the measurement data of all the measurement items is transmitted to the control unit 30 after sample IDs are read by the reading unit 20.

The display control unit 326 causes an image to be displayed on the display unit 360. For example, as will be described later, when an operation to execute the search of sample information is performed in a state in which it is specified that only pieces of the sample information of samples under measurement are set as search targets, the display control unit 326 sets only pieces of the sample information of samples under measurement among the sample information of all the samples as search targets based on progress information, extracts the sample information of samples matching with a specified search condition from the set search targets, and causes the extracted sample information to be displayed on the display unit 360 in a list form. Further, for example, the display control unit 326 acquires measurement data recorded on the storage unit 380 and causes the acquired measurement to be displayed on the display unit 360.

1.2. User Interface Screen

Figure 4:
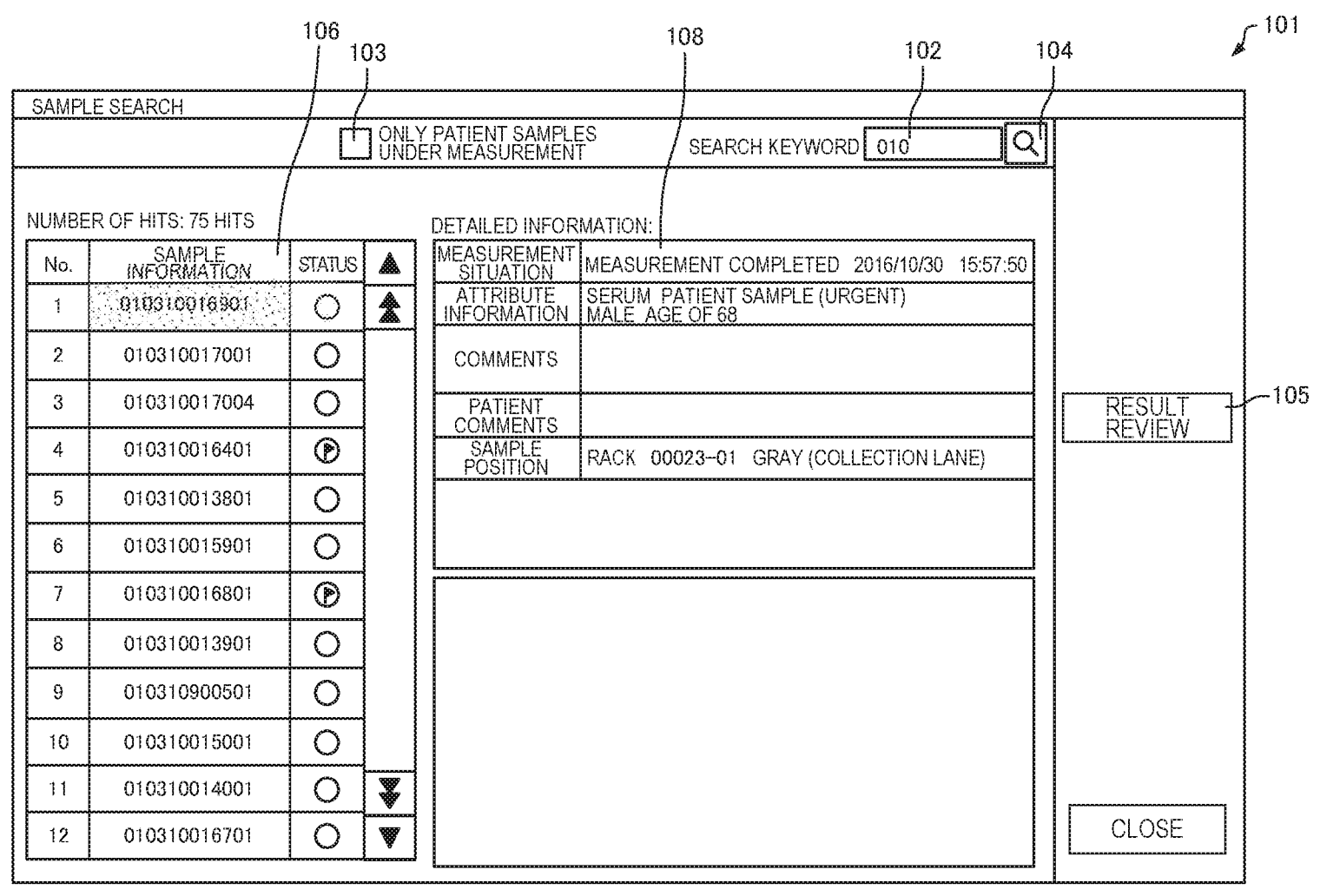

FIGS. 4 and 5 are diagrams illustrating an example of a sample search screen 101 of the automatic analyzer 100. Note that FIG. 4 illustrates a state in which a check box 103 is unchecked and FIG. 5 illustrates a state in which the check box 103 is checked.

The sample search screen 101 is used to confirm the progress of the measurement of samples. As illustrated in FIGS. 4 and 5, an input field 102 to which a search keyword is input, a search execution button 104, a search result display region 106 in which the sample information of samples matching with a search keyword is displayed, and a detailed information display region 108 in which the detailed information of samples is displayed are displayed on the sample search screen 101.

In addition, the check box 103 for specifying whether "only patient samples under measurement," that is, only pieces of the sample information of samples under measurement are set as search targets or not is displayed on the sample search screen 101.

When the check box 103 is unchecked, the pieces of sample information of all the samples stored in the storage unit 380 are set as search targets. In contrast, when the check box 103 is checked, it is specified that only pieces of the sample information of samples under measurement are set as search targets.

Note that in the example illustrated in the figures, the check box 103 is used as a button for specifying whether only pieces of the sample information of samples under measurement are set as search targets or not. However, instead of a check box, any button may be used as long as the button can specify whether only pieces of the sample information of samples under measurement are set as search targets or not.

In addition, a result review button 105 for displaying a "result review" is displayed on the sample search screen 101.

The search of sample information is executed with characters input to the input field 102 as a keyword when the search execution button 104 is pressed in a state in which the check box 103 is unchecked as illustrated in FIG. 4. As a result, a list of the sample information of samples matching with the keyword is displayed in the search result display region 106. In the example illustrated in FIG. 4, characters "010" is input to the input field 102, and sample IDs including the line of the characters "010" in their sample IDs or comments and the statuses of samples are displayed in the search result display region 106.

When a piece of sample information is selected from the list displayed in the search result display region 106, detailed information on a sample corresponding to the selected sample information is displayed in the detailed information display region 108. The detailed information includes the progress information of the measurement of the sample. The progress information displayed in the detailed information display region 108 includes, for example, information as to whether the measurement has been completed or not, a time at which the measurement will be completed or a time at which the measurement was completed, the position information of the sample inside the automatic analyzer 100, or the like.

Figure 6:
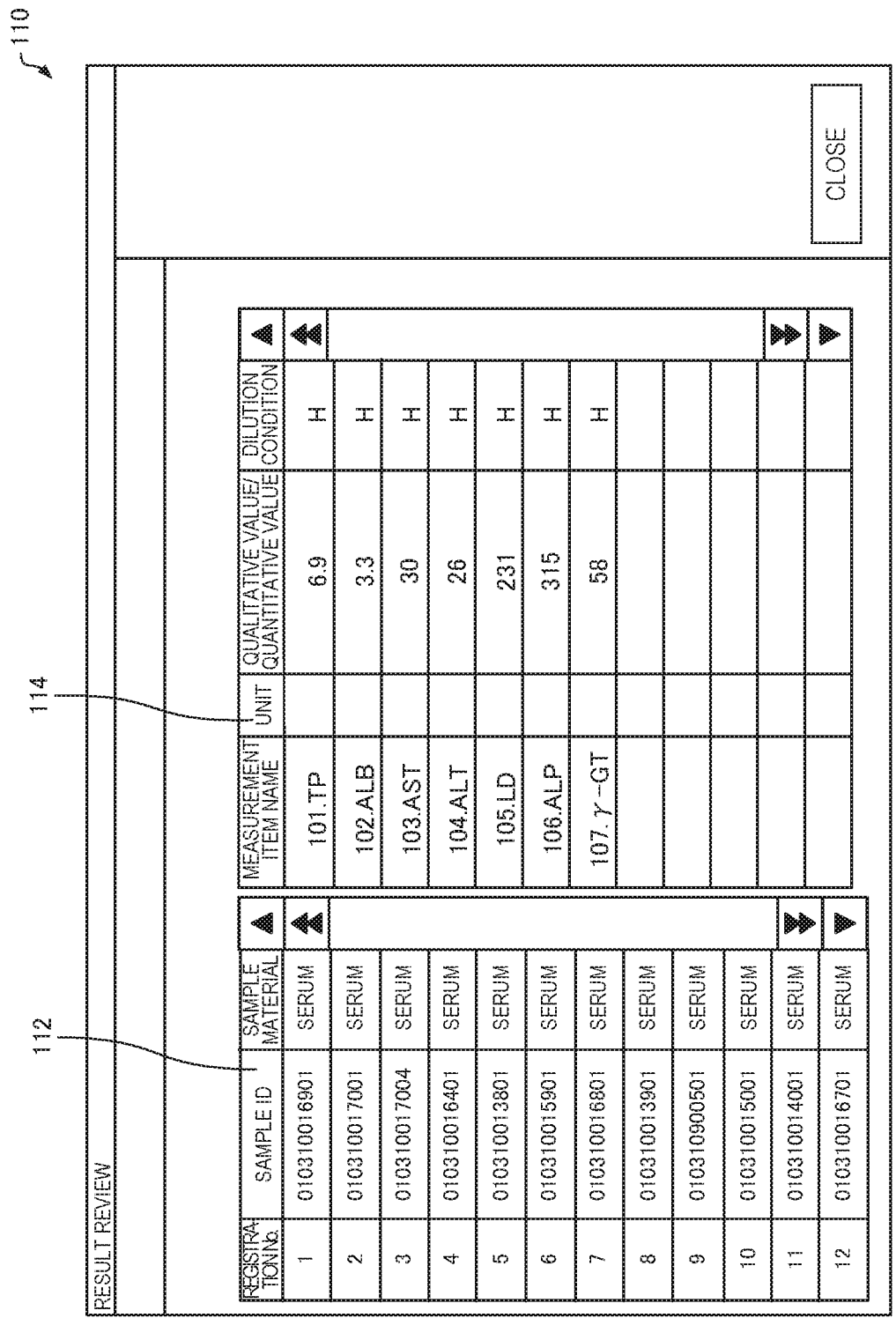
FIG. 6 is a diagram illustrating an example of a result review screen of the automatic analyzer according to the first embodiment.

In addition, when the result review button 105 is pressed, the measurement results of a sample corresponding to selected sample information are displayed on a result review screen 110 illustrated in FIG. 6.

On the result review screen 110, a region 112 in which sample IDs and sample materials are displayed and a measurement result display region 114 in which the measurement results of samples are displayed are displayed. When the result review button 105 is pressed, the measurement data of a sample corresponding to selected sample information is displayed in the measurement result display region 114. Note that when the sample is under measurement, only measurement data that has been measured is displayed in the measurement result display region 114.

The search of sample information is executed with characters input to the input field 102 as a keyword when the search execution button 104 is pressed in a state in which the check box 103 is checked as illustrated in FIG. 5. Like this, when an operation to execute the search of sample information is performed in a state in which it is specified that only pieces of the sample information of samples under measurement are set as search targets, only pieces of the sample information of samples under measurement among the sample information of all the samples are set as search targets and pieces of the sample information of samples matching with a keyword among the set search targets are extracted. As a result, in the search result display region 106, a list of the sample information of the samples under measurement and match the keyword is displayed.

Note that when the search execution button 104 is pressed in a state in which the check box 103 is checked without the input of characters to the input field 102, the sample information of all the samples under measurement is extracted and displayed in the search result display region 106.

In the example illustrated in FIG. 5, sample IDs are displayed as sample information in the search result display region 106. Further, in the search result display region 106, the end times of the measurement of samples are displayed together with the sample IDs. In a list including the sample information and the end times of the measurement, the sample information is arranged in the order of the earlier end times of the measurement.

When a piece of sample information is selected from the list displayed in the search result display region 106, detailed information on a sample corresponding to selected sample information is displayed in the detailed information display region 108. The detailed information includes the progress information of the measurement of the sample. The progress information displayed in the detailed information display region 108 includes, for example, information as to whether the measurement has been completed or not, a time at which the measurement will be completed or a time at which the measurement was completed, the position information of the sample inside the automatic analyzer 100, or the like.

In addition, when the result review button 105 is pressed, the measurement result of a sample corresponding to selected sample information is displayed on the result review screen 110 illustrated in FIG. 6.

Figure 7:
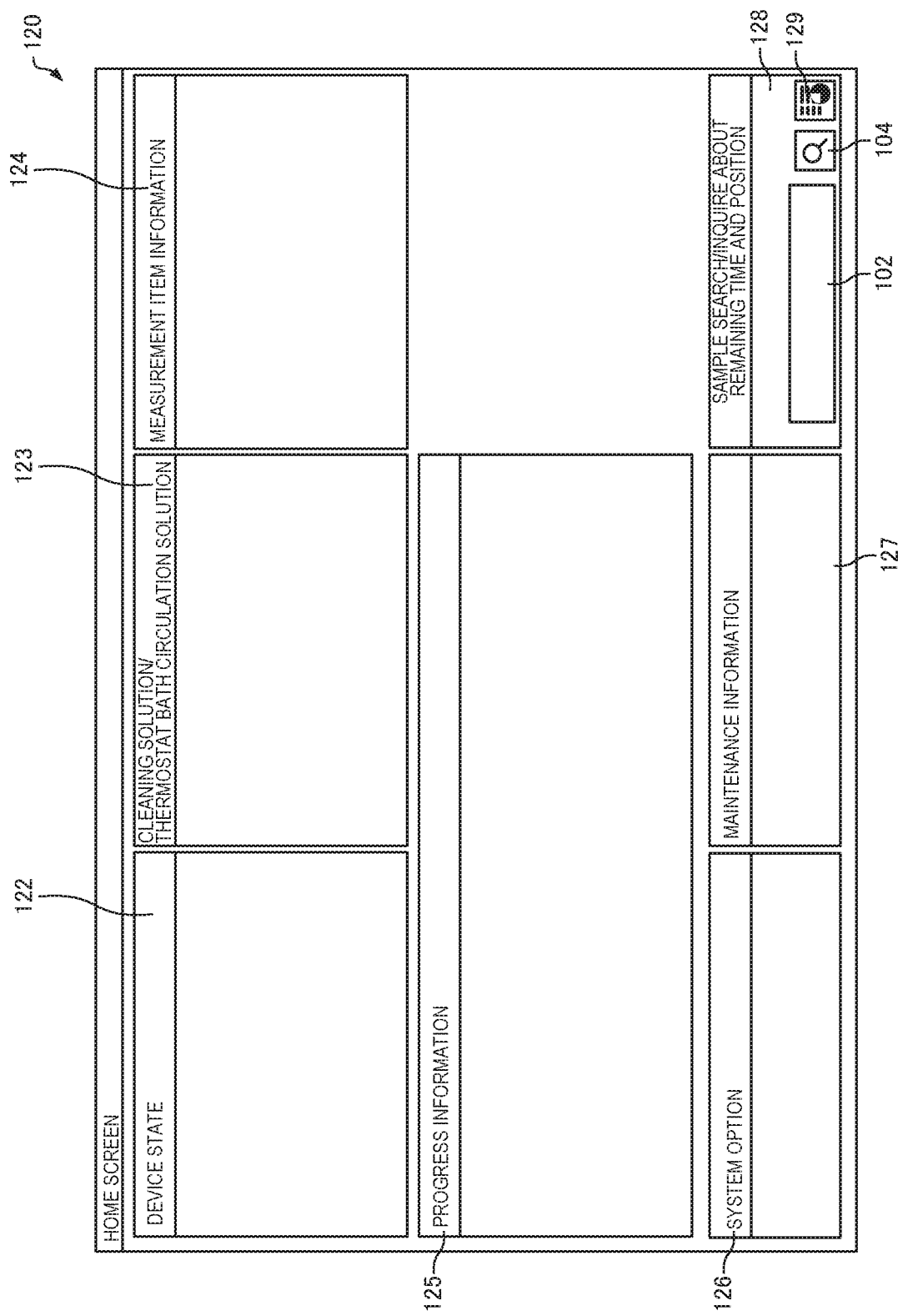
FIG. 7 is a diagram illustrating an example of a home screen of the automatic analyzer according to the first embodiment.

FIG. 7 is a diagram illustrating an example of a home screen 120 of the automatic analyzer 100. The home screen 120 is an initial screen displayed when the automatic analyzer 100 activates. On the home screen 120, various screens are displayed according to an operation. In the example illustrated in FIG. 7, a region 122 in which device states are shown, a region 123 in which the states of a cleaning solution and a thermostat bath circulation solution are shown, a region 124 in which measurement item information is shown, a region 125 in which progress information is shown, a region 126 in which system options are shown, a region 127 in which maintenance information is shown, and a region 128 in which sample search is executed are displayed on the home screen 120.

In the region 128 in which sample search is executed, an input field 102 to which a search keyword is input and a search execution button 104 are displayed. When the search execution button 104 is pressed, the search of sample information is executed with characters input to the input field 102 as a keyword.

In addition, a button 129 for executing the search of only the sample information of samples under measurement is displayed on the home screen 120. When the button 129 is pressed, the sample search screen 101 illustrated in FIG. 5 is displayed. That is, the sample search screen 101 in a state in which the check box 103 is checked is displayed.

Note that the button 129 for executing the search of only the sample information of samples under measurement may be displayed not only on the home screen 120 but also on various screen such as a monitor screen for confirming progress.

1.3. Processing 1.3.1. Display of Sample Information

Figure 8:
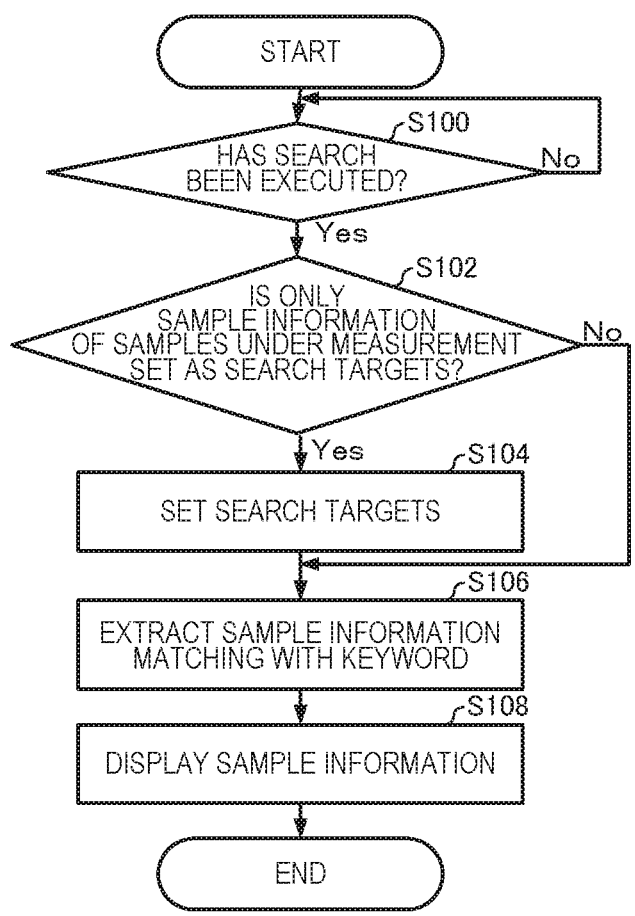
FIG. 8 is a flowchart illustrating an example of a processing of a processing unit of the automatic analyzer according to the first embodiment.

FIG. 8 is a flowchart illustrating an example of the processing of the processing unit 320 of the automatic analyzer 100. Hereinafter, processing to search for the sample information of samples and causes sample information matching with a keyword to be displayed on the display unit 360 in a list form will be described.

The input reception unit 324 determines whether an operation (hereinafter also called a "search execution operation") to execute the search of sample information has been performed or not (S100). The search execution operation is, for example, an operation by an operator to press the search execution button 104 illustrated in FIG. 4 using the operation unit 340. The input reception unit 324 determines that the search execution operation has been performed when receiving an operation signal related to the search execution operation from the operation unit 340.

When determining that the search execution operation has been performed (Yes in S100), the input reception unit 324 determines whether an operation (hereinafter also called a "search target specifying operation") to specify whether only pieces of the sample information of samples under measurement are set as search targets or not has been performed or not (S102). The search target specifying operation is, for example, an operation by the operator to check the check box 103 as illustrated in FIG. 5 using the operation unit 340. When receiving an operation signal related to the search target specifying operation from the operation unit 340, the input reception unit 324 determines that the search target specifying operation has been performed.

When it is determined that the search target specifying operation has been performed (Yes in S102), the display control unit 326 sets only pieces of the sample information of the samples under measurement among the sample information of all the samples as search targets based on progress information stored in the storage unit 380 (S104). The display control unit 326 extracts pieces of the sample information of samples matching with a keyword from the set search targets (S106).

For example, the display control unit 326 specifies samples under measurement based on the progress information of all the samples stored in the storage unit 380 and extracts the sample information of samples matching with a keyword input to the input field 102 with only pieces of the sample information of the samples under measurement as search targets. Here, a case in which the sample information matches with the keyword includes not only a case in which the sample information completely matches with the keyword but also a partially-matching case in which a part of the sample information includes the line of characters input as the keyword. Further, when a keyword is not input to the input field 102, the sample information of all the samples under measurement is extracted.

The display control unit 326 causes the extracted sample information to be displayed in a list form in the search result display region 106 illustrated in FIG. 5 (S108). At this time, the display control unit 326 causes, for example, sample IDs and the information of the end times of the measurement of the samples to be displayed on the display unit 360 as the sample information of the samples.

In contrast, when it is determined that the search target specifying operation has not been performed (No in S102), the display control unit 326 extracts the sample information of samples matching with the keyword from the sample information of all the samples stored in the storage unit 380 (S106). The display control unit 326 causes the extracted sample information to be displayed in a list form in the search result display region 106 illustrated in FIG. 4 (S108).

By the above processing, it is possible to search for the sample information of samples and causes sample information matching with a keyword to be displayed in a list form.

1.3.2. Display of Measurement Results

Figure 9:
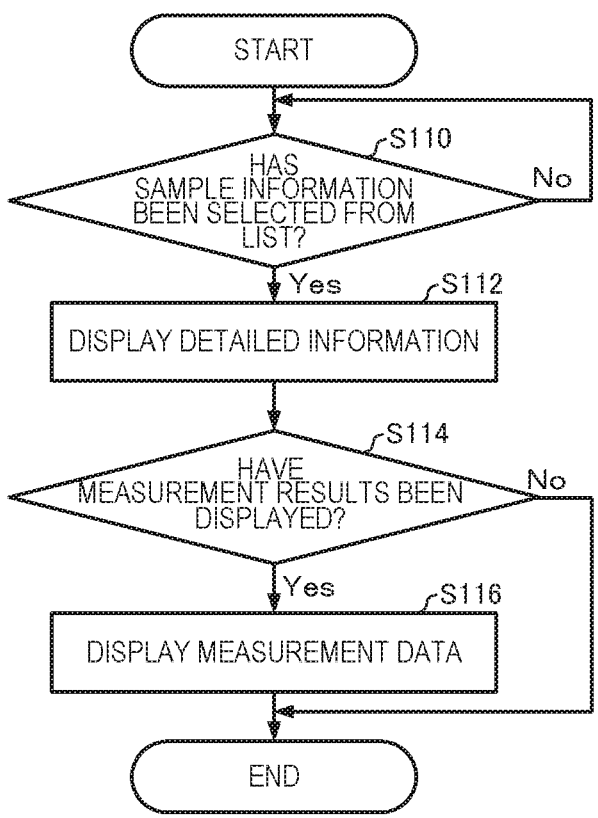
FIG. 9 is a flowchart illustrating an example of a processing of the processing unit of the automatic analyzer according to the first embodiment.

FIG. 9 is a flowchart illustrating an example of the processing of the processing unit 320 of the automatic analyzer 100. Hereinafter, processing to cause the measurement results of samples to be displayed on the display unit 360 will be described.

As illustrated in FIG. 4 or 5, the input reception unit 324 determines whether an operation (hereinafter also called a "selective operation") to select a piece of sample information out of the pieces of sample information displayed in a list form in the search result display region 106 has been performed or not (S110). The selective operation is, for example, an operation by an operator to select a region in which desired sample information (sample ID) is displayed from the list displayed in the search result display region 106 illustrated in FIG. 4 or 5 using the operation unit 340. The input reception unit 324 determines that the selective operation has been performed when receiving an operation signal related to the selective operation from the operation unit 340.

When it is determined that the selective operation has been performed (Yes in S110), the display control unit 326 causes the detailed information of a sample corresponding to the selected sample information to be displayed in the detailed information display region 108 (S112).

Next, the input reception unit 324 determines whether an operation (hereinafter also called a "measurement result display operation") to display measurement results has been performed or not (S114). The measurement result display operation is, for example, an operation by the operator to press the result review button 105 illustrated in FIG. 4 or 5 using the operation unit 340. The input reception unit 324 determines that the measurement result display operation has been performed when receiving an operation signal related to the measurement result display operation from the operation unit 340.

When it is determined that the measurement result display operation has been performed (Yes in S114), the display control unit 326 causes the measurement data (measurement results) of a sample corresponding to the selected sample information to be displayed in the measurement result display region 114 of the result review screen 110 illustrated in FIG. 6 (S116).

By the above processing, it is possible to cause the measurement results of samples to be displayed on the display unit 360.

1.4. Effects

In the automatic analyzer 100, the input reception unit 324 receives an operation to specify whether only pieces of the sample information of samples under measurement are set as search targets or not, an operation to specify the search condition for the sample information, and an operation to execute the search of the sample information. Further, when the operation to execute the search of sample information is performed in a state in which it is specified that only pieces of the sample information of samples under measurement are set as search targets, the display control unit 326 sets only pieces of the sample information of the samples under measurement among the sample information of all the samples as search targets based on progress information. Then, the display control unit 326 extracts pieces of the sample information of samples matching with a specified search condition among the set search targets and causes the extracted sample information to be displayed on the display unit 360 in a list form.

As described above, since the automatic analyzer 100 can set only pieces of the sample information of samples under measurement as search targets and extract sample information matching with a search condition, the sample information of samples under measurement can be easily confirmed. For example, as described above, only pieces of the sample information of samples under measurement can be displayed in a list form by checking the check box 103. the automatic analyzer 100 thus can search for the sample information of samples under measurement in a lump with excellent usability.

In the automatic analyzer 100, the display control unit 326 causes information on the end times of the measurement of samples to be displayed on the display unit 360 together with sample IDs. Therefore, when receiving an inquiry about the progress of examination from a doctor, for example, the automatic analyzer 100 can shorten a time required to make a response.

In the automatic analyzer 100, the input reception unit 324 receives an operation to select desired sample information out of sample information displayed in a list form, and the display control unit 326 causes the progress information of a sample corresponding to the selected sample information to be displayed on the display unit 360. Therefore, the automatic analyzer 100 can easily confirm progress information.

In the automatic analyzer 100, the display control unit 326 causes the sample search screen 101, in which the button (the check box 103) for specifying whether only pieces of the sample information of samples under measurement are set as search targets or not is shown, to be displayed on the display unit 360, and an operation to specify whether only pieces of the sample information of samples under measurement are set as search targets or not is an operation to select a button (the check box 103). Therefore, the automatic analyzer 100 can easily confirm the progress information of the measurement of samples under measurement.

2. Second Embodiment

Figure 10:
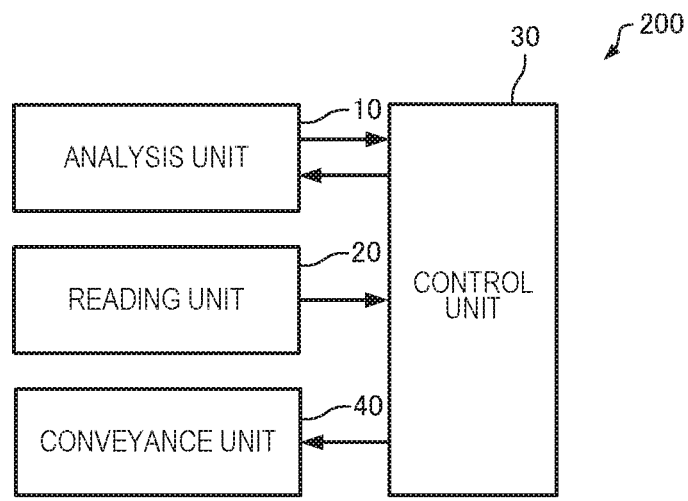
FIG. 10 is a diagram illustrating a configuration of an automatic analyzer according to a second embodiment.

Next, an automatic analyzer according to a second embodiment will be described with reference to the drawings. FIG. 10 is a diagram illustrating a configuration of an automatic analyzer 200 according to the second embodiment. In the automatic analyzer 200 according to the second embodiment, members having the same functions as those of the constituting members of the automatic analyzer 100 according to the first embodiment will be denoted by the same symbols, and their detailed descriptions will be omitted.

As illustrated in FIG. 10, the automatic analyzer 200 includes a conveyance unit 40.

Figure 11:
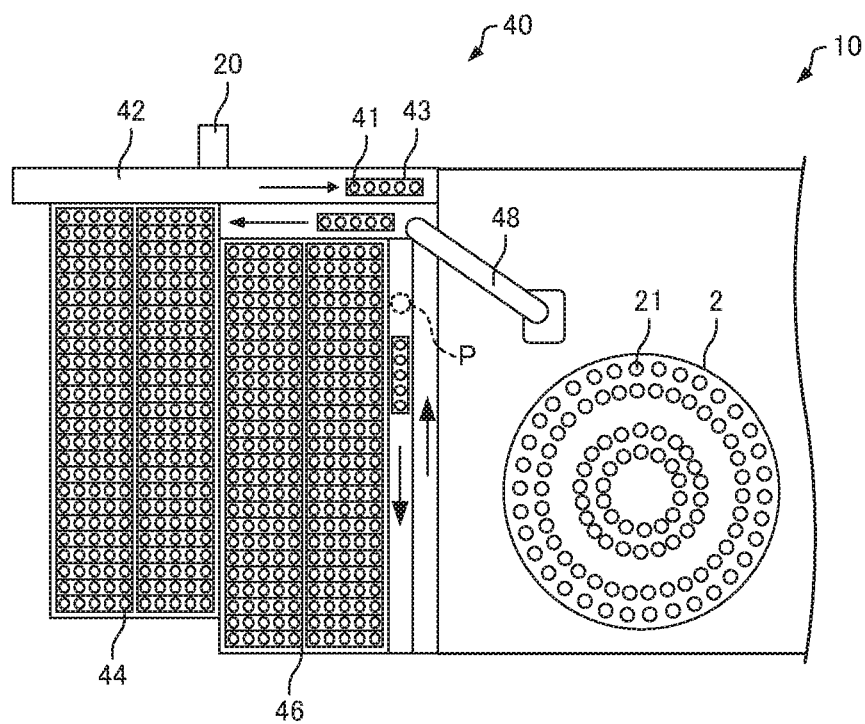
FIG. 11 is a diagram schematically illustrating a conveyance unit.

FIG. 11 is a diagram schematically illustrating the conveyance unit 40.

The conveyance unit 40 has a conveyance line 42 that conveys sample containers 41, a sample supply unit 44 in which the sample containers 41 having a sample accommodated therein are set, and a collection unit 46 in which the sample containers 41 having a sample extracted therefrom are collected. In the automatic analyzer 200, the conveyance unit 40 is provided with a reading unit 20.

The conveyance line 42 conveys the sample containers 41 from the sample supply unit 44 to a dispensing position P. The reading unit 20 is provided on a path through which the sample containers 41 are conveyed from the sample supply unit 44 to the dispensing position P.

The conveyance line 42 conveys the sample containers 41 having a sample extracted therefrom at the dispensing position P from the dispensing position P to the collection unit 46. In an example illustrated in FIG. 11, a plurality of sample containers 41 are accommodated in one rack 43, and the conveyance line 42 conveys the rack 43.

At the dispensing position P, samples inside the sample containers 41 are dispensed into, for example, dilution containers 23 by a probe 48. In this manner, samples are supplied from the conveyance unit 40 to the analysis unit 10. Note that a probe for dispensing samples inside the sample containers 41 is not particularly limited and the probe 48 may be replaced by an original sample sampling probe 7.

In the automatic analyzer 200, an analysis control unit 322 controls the conveyance unit 40. For example, when the reading unit 20 reads sample IDs, the analysis control unit 322 reads the measurement items of samples corresponding to the sample IDs from the storage unit 380. The analysis control unit 322 controls the conveyance unit 40 based on the acquired measurement items. As a result, the sample containers 41 are conveyed so that measurement is performed according to the measurement items of samples in the conveyance unit 40.

In the automatic analyzer 200, the progress information of the measurement of samples includes the position information of samples in the conveyance unit 40. Therefore, the sample information of samples under measurement includes the sample information of samples that are being conveyed in the conveyance unit 40. Accordingly, the automatic analyzer 200 can search for sample information in a lump with respect to the conveyance unit 40 and the analysis unit 10 when searching for the sample information of samples under measurement.

The automatic analyzer 200 is capable of producing the same functions and effects as those of the automatic analyzer 100 described above. In addition, the automatic analyzer 200 is capable of easily confirming the sample information of samples under measurement in the conveyance unit 40 and the analysis unit 10.

3. Third Embodiment

Figure 12:
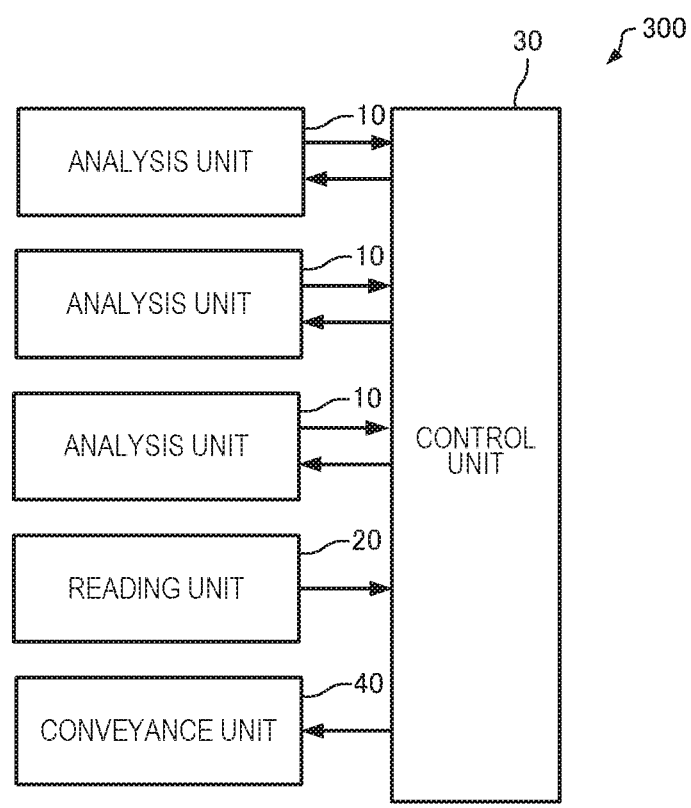
FIG. 12 is a diagram illustrating a configuration of an automatic analyzer according to a third embodiment.

Next, an automatic analyzer according to a third embodiment will be described with reference to the drawings. FIG. 12 is a diagram illustrating a configuration of an automatic analyzer 300 according to the third embodiment. In the automatic analyzer 300 according to the third embodiment, members having the same functions as those of the constituting members of the automatic analyzer 100 according to the first embodiment and the constituting members of the automatic analyzer 200 according to the second embodiment will be denoted by the same symbols, and their detailed descriptions will be omitted.

As illustrated in FIG. 12, the automatic analyzer 300 includes a plurality of analysis units 10. Each of the plurality of analysis units 10 may perform the measurement of different items or the measurement of the same items. Samples are supplied to the plurality of analysis units 10 by a conveyance unit 40.

In the automatic analyzer 300, the progress information of the measurement of samples includes the position information of samples in the conveyance unit 40. Therefore, the sample information of samples under measurement includes the sample information of samples that are being conveyed in the conveyance unit 40. Accordingly, the automatic analyzer 300 can search for sample information in a lump with respect to the conveyance unit 40 and the plurality of analysis units 10 when searching for the sample information of samples under measurement.

The automatic analyzer 300 is capable of producing the same functions and effects as those of the automatic analyzer 100 described above. In addition, the automatic analyzer 300 is capable of easily confirming the sample information of samples under measurement in the conveyance unit 40 and the plurality of analysis units 10.

4. Fourth Embodiment 4.1. Configuration of Automatic Analyzer

The configuration of an automatic analyzer according to a fourth embodiment is the same as that of the automatic analyzer 100 illustrated in FIGS. 1 to 3, and its illustrations and descriptions will be omitted.

4.2. User Interface Screen

FIG. 13 is a diagram illustrating an example of a sample search screen 101 of the automatic analyzer according to the fourth embodiment. Note that FIG. 13 illustrates a state in which a check box 202 is checked.

As illustrated in FIG. 13, the sample search screen 101 displays the check box 202 for specifying whether only pieces of the sample information of samples that have not normally completed measurement are set as search targets or not.

When the check box 202 is unchecked, pieces of the sample information of all the samples are set as search targets. In contrast, when the check box 202 is checked, it is specified that only pieces of the sample information of samples that have not normally completed measurement are set as search targets.

Note that the samples that have not normally completed measurement mean samples having no measurement items, samples that have stopped measurement due to a sample or device error, samples that require re-examination, or the like. The samples having no measurement items mean samples for which an analysis control unit 322 has not acquired measurement items. It is possible to determine whether measurement has been normally completed or not according to the progress information of samples and measurement data.

Further, a transmission button 203, a report print button 204, and a real-time monitor button 205 are displayed on the sample search screen 101.

When a search execution button 104 is pressed in a state in which the check box 202 is unchecked, the search of sample information is executed with characters input to an input field 102 as a keyword. As a result, a list of the sample information of samples matching with a keyword is displayed in a search result display region 106. The list includes sample IDs and the statuses of samples.

When the search execution button 104 is pressed in a state in which the check box 202 is checked as illustrated in FIG. 13, the search of sample information is executed with characters input to the input field 102 as a keyword. When an operation to execute the search of sample information is performed in a state in which it is specified that only pieces of sample information of samples that have not normally completed measurement are set as search targets as described above, only pieces of the sample information of samples that have not normally completed measurement among the sample information of all the samples are set as search targets and then pieces of the sample information of samples matching with a keyword among the set search targets are extracted. As a result, a list of the sample information of samples that have not normally completed measurement and match a keyword is displayed in the search result display region 106.

When a piece of sample information is selected from a list displayed in the search result display region 106, detailed information about a sample corresponding to the selected sample information is displayed in a detailed information display region 108. The detailed information includes the progress information of a sample.

Further, when the transmission button 203 is pressed, the measurement results of a sample corresponding to selected sample information is transmitted to a laboratory information system (LIS) serving as an external system.

Further, when the report print button 204 is pressed, the measurement data of a sample corresponding to selected sample information is printed in a report format.

Further, when the real-time monitor button 205 is pressed, a measurement log of a sample corresponding to selected sample information is displayed on a real-time monitor screen (not shown).

4.3. Processing

Figure 14:
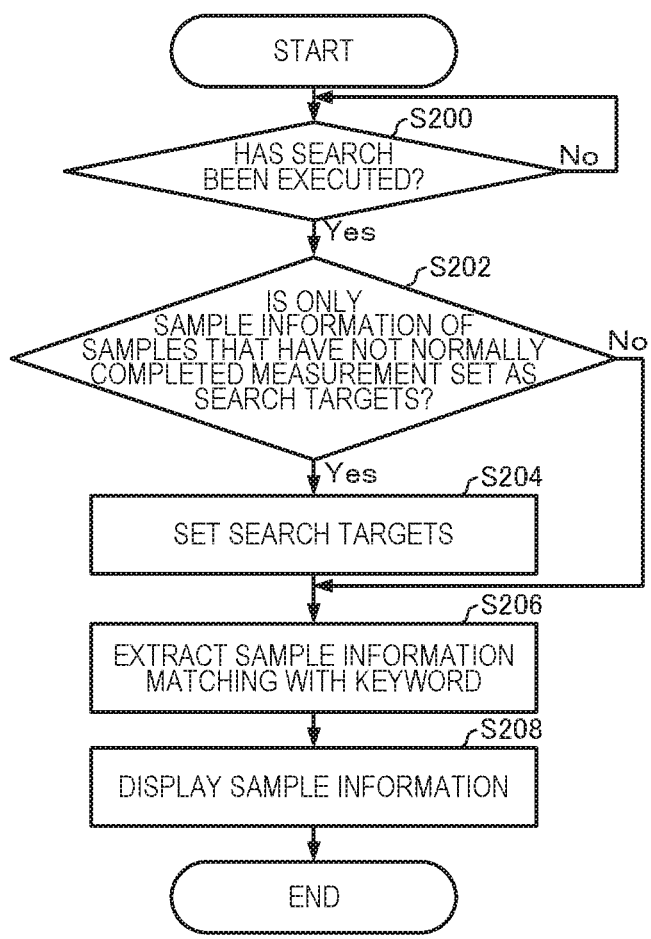
FIG. 14 is a flowchart illustrating an example of a processing of a processing unit of the automatic analyzer according to the fourth embodiment.

FIG. 14 is a flowchart illustrating an example of a processing of a processing unit 320 of the automatic analyzer according to the fourth embodiment. Hereinafter, processing to search for the sample information of samples and causes sample information matching with a keyword to be displayed on a display unit 360 in a list form will be described. Note that a point different from that of the processing illustrated in FIG. 8 will be described and the description of the same point will be omitted below.

An input reception unit 324 determines whether a search execution operation has been performed or not (S200). When determining that the search execution operation has been performed (Yes in S200), the input reception unit 324 determines whether an operation (hereinafter also called an "abnormal sample specifying operation") to specify whether only pieces of the sample information of samples that have not normally completed measurement are set as search targets or not has been performed or not (S202).

The abnormal sample specifying operation is, for example, an operation by an operator to check the check box 202 as illustrated in FIG. 13 using an operation unit 340. The input reception unit 324 determines that the abnormal sample specifying operation has been performed when receiving an operation signal related to the abnormal sample specifying operation from the operation unit 340.

When it is determined that the abnormal sample specifying operation has been performed (Yes in S202), a display control unit 326 sets only the sample information of the samples that have not normally completed the measurement among pieces of the sample information of all the samples as search targets based on progress information and measurement data stored in a storage unit 380 (S204). The display control unit 326 extracts pieces of the sample information of samples matching with a keyword from the set search targets (S206).

The display control unit 326 specifies the samples that have not normally completed the measurement based on the progress information and the measurement data of all the samples stored in the storage unit 380 and then extracts the sample information of samples matching with the keyword input to the input field 102 while pieces of the sample information of the samples that have not normally completed the measurement is set as search targets.

The display control unit 326 causes the extracted sample information to be displayed in a list form in the search result display region 106 illustrated in FIG. 13 (S208).

In contrast, when it is determined that the abnormal sample specifying operation has not been performed (No in S202), the display control unit 326 extracts the sample information of the samples matching with the keyword from the sample information of all the samples (S206). The display control unit 326 causes the extracted sample information to be displayed in a list form in the search result display region 106 illustrated in FIG. 13 (S208).

By the above processing, it is possible to search for the sample information of samples and causes sample information matching with a keyword to be displayed in a list form.

4.4. Effects

In the automatic analyzer according to the fourth embodiment, the input reception unit 324 receives an operation to specify whether only pieces of the sample information of samples that have not normally completed measurement are set as search targets or not, an operation to specify the search condition for the sample information, and an operation to execute the search of the sample information. Further, when an operation to execute the search of sample information is performed in a state in which it is specified that only pieces of the sample information of samples that have not normally completed measurement are set as search targets, the display control unit 326 sets only pieces of the sample information of samples that have not normally completed measurement among the sample information of all the samples as search targets based on the progress information of the samples and the measurement results of the samples in the analysis unit 10. Then, the display control unit 326 extracts pieces of the sample information of samples matching with a specified search condition among the set search targets and causes the extracted sample information to be displayed on the display unit 360 in a list form.

As described above, since the automatic analyzer according to the fourth embodiment can set only pieces of the sample information of samples that have not normally completed measurement as search targets and extract sample information matching with a search condition, the sample information of samples that have not normally completed measurement can be easily confirmed. For example, as described above, only pieces of the sample information of samples that have not normally completed measurement can be displayed in a list form by checking the check box 202. The automatic analyzer thus can search for the sample information of samples that have not normally completed measurement in a lump with excellent usability.

The invention is not limited to the embodiments described above, and may be modified in various ways. For example, the invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. An automatic analyzer comprising:
   a reading unit that reads identification information for identifying samples;
   an analysis unit that measures samples;
   an analysis control unit that performs processing to acquire measurement item information of samples identified by the identification information read by the reading unit and control the analysis unit based on the acquired measurement item information, and processing to update progress information of measurement of samples;
   an input reception unit that receives an operation to specify a search condition for sample information of samples, an operation to specify whether only pieces of the sample information of samples under measurement among all samples are set as search targets, and an operation to execute search of the sample information; and
   a display control unit that, when the operation to execute search of the sample information is performed in a state in which only pieces of the sample information of samples under measurement are specified to be search targets, sets only pieces of the sample information of samples under measurement among all samples as search targets based on the progress information, extracts pieces of the sample information of samples matching with a specified search condition out of the set search targets, and causes the extracted pieces of the sample information to be displayed on a display unit in a list form.

2. The automatic analyzer according to claim 1, wherein the display control unit causes the identification information and information relating to end times of measurement of samples to be displayed on the display unit as the sample information.

3. The automatic analyzer according to claim 1, wherein
the input reception unit receives an operation to select desired pieces of the sample information out of pieces of the sample information displayed in the list form, and
the display control unit causes the progress information of a sample corresponding to the selected pieces of the sample information to be displayed on the display unit.

4. The automatic analyzer according to claim 1, further comprising:
another analysis unit that measures samples; and
a conveyance unit that conveys samples to the analysis unit and the other analysis unit.

5. The automatic analyzer according to claim 1, wherein
the display control unit causes a search screen in which a button for specifying whether only pieces of the sample information of samples under measurement among all samples are set as search targets or not is shown, to be displayed on the display unit, and
an operation to specify whether only pieces of the sample information of samples under measurement among all samples are set as search targets or not is an operation to select the button.

6. An automatic analyzer comprising:
a reading unit that reads identification information for identifying samples;
an analysis unit that measures samples;
an analysis control unit that performs processing to acquire measurement item information of samples identified by the identification information read by the reading unit and control the analysis unit based on the acquired measurement item information, and processing to update progress information of measurement of samples;
an input reception unit that receives an operation to specify a search condition for sample information of samples, an operation to specify whether only pieces of the sample information of samples that have not normally completed measurement among all samples are set as search targets, and an operation to execute search of the sample information; and
a display control unit that, when the operation to execute search of the sample information is performed in a state in which only pieces of the sample information of samples that have not normally completed measurement are specified to be search targets, sets only pieces of the sample information of samples that have not normally completed measurement among all samples as search targets based on the progress information and a measurement result of the analysis unit, extracts pieces of the sample information of samples matching with a specified search condition from the set search targets, and causes the extracted pieces of the sample information to be displayed on a display unit in a list form.

* * * * *